United States Patent Office 3,411,861
Patented Nov. 19, 1968

3,411,861
PROCESS FOR DYEING SYNTHETIC POLYAMIDE FIBERS WITH 1,4 - DISUBSTITUTED ANTHRAQUINONE DYES
Jacques Guenthard, Binningen, Basel-Land, and Fred Mueller, Munchenstein, Basel-Land, Switzerland, assignors to Sandoz Ltd. (also known as Sandoz A.G.), Basel, Switzerland
No Drawing. Filed Feb. 15, 1966, Ser. No. 527,507
Claims priority, application Switzerland, Mar. 5, 1965, 3,066/65; Mar. 18, 1965, 3,800/65
3 Claims. (Cl. 8—39)

Anthraquinone dyes which contain in at least one α-position the group

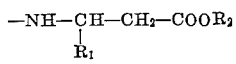

where $R_1$ represents hydrogen or low molecular alkyl, and $R_2$ represents alkyl, hydroxyalkyl or alkoxyalkyl, are disclosed in United States Patent 2,319,043. In the said patent it is stated that these anthraquinone dyes are especially suitable for dyeing organic cellulose derivatives but that they show lower affinity for silk and wool.

It has now been found that dyes of the formula

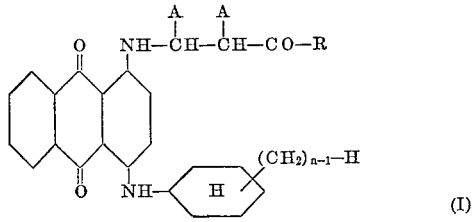

where one A represents a hydrogen atom the other A stands for a hydrogen atom or a methyl radical, and R stands for either substituted or unsubstituted alkoxy, cycloalkoxy or aralkoxy, each having a total of at most 8 carbon atoms or hydroxy, and $n$ stands for 1 or 2, give dyeings on synthetic polyamides which have excellent fastness properties.

The synthetic polyamide fibres dyed with these dyes may be the condensation products of 1,6-hexamethylene diamine and adipic acid (nylon 66) or sebacic acid (nylon 610), the polymerization products of ε-caprolactam (nylon 6), the polycondensation products of ω-aminoundecanoic acid (nylon 11), or mixed condensation products of 1,6-hexamethylene diamine, adipic acid and ε-caprolactam (nylon 6/66).

The substituent R is preferably alkoxy, e.g., methoxy, ethoxy, n-propoxy, n-butoxy; hydroxy-alkoxy, e.g. 2-hydroxyethoxy, 2- or 3-hydroxypropoxy, 3- or 4-hydroxybutoxy, 6-hydroxyhexoxy; alkoxyalkoxy, e.g. 2-methoxyethoxy, 2-ethoxyethoxy, 2-butoxyethoxy, 3-methoxypropoxy, 4-methoxy- or 4-ethoxy-butoxy; hydroxyalkoxy-alkoxy or alkoxy-alkoxy-alkoxy, e.g. 2-(2′-hydroxyethoxy)ethoxy, 2-(2′-methoxyethoxy)-ethoxy, 2-(2′-ethoxyethoxy)-ethoxy, benzyloxy, phenylethoxy or cyclohexyloxy.

The dyes of Formula I may be applied singly or in mixture with each other, in which latter case the affinity is substantially improved. Examples of such mixtures are 1-(2′-ethoxycarbonylethylamino)- and 1-(2′-butoxycarbonylethylamino)-4-cyclohexylaminoanthraquinone; 1-(2′-hydroxyethoxy-carbonylethylamino)- and 1-(2′-ethoxyethoxycarbonylethylamino) - 4 - cyclohexylamino-anthraquinone; 1-(carboxy-ethylamino)- and 1-(4′-hydroxybutoxycarbonylethylamino) - 4 - cyclohexylaminoanthraquinone.

The dyes of Formula I can be produced from the corresponding 1-amino-4-cycloalkylaminoanthraquinones by adding on acrylic acid, methacrylic acid or crotonic acid, or their acid esters, amides or nitriles, to the amino group, or from the corresponding 1-bromo-4-cycloalkylaminoanthraquinones by reaction with β-aminocarboxylic acid esters, for examples $H_2$—$CH_2$—$CH_2$—COO—$C_2H_5$ or

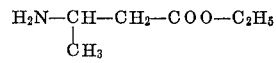

The dyes of Formula I are preferably converted into dye preparations before use. For this purpose they are comminuted until the average particle size is about 0.01 to 10 microns or, more particularly, 0.1 to 5 microns. Comminution can be carried out in the presence of dispersants and/or fillers. For example, the dried dye can be ground with a dispersant, if necessary in the presence of fillers, or it can be kneaded in paste form with a dispersant and subsequently vacuum or jet dried. After the addition of a suitable volume of water, the resulting preparations are applied to the material by dyeing, padding or printing methods. For dyeing at long liquor ratios, it is general to use up to 20 grams of dye per litre; for dying at short ratios, up to about 80 grams per litre; in padding, up to about 150 grams per litre are used; and on printing, up to about 150 grams per kilogram of printing paste. The ratio may vary within wide limits, for example from 1:3 to 1:200 or, preferably, 1:3 to 1:80.

The dyes of Formula I, which are sparingly soluble to insoluble in water, build up on synthetic polyamide fibres from aqueous dispersion. They can be dyed in the temperature range of 75° to 100° C. at atmospheric pressure or, alternatively, at temperatures above 100° C., e.g. 100–140° C., in pressure dyeing machines. After dyeing, the material is removed, rinsed and dried.

Synthetic polyamide materials can be padded or printed with dyes of Formula I from aqueous dispersion. The pad dyeings or prints are fixed at about 100–230° C., for example at about 100–104° C., by means of water vapour or at 110–130° C. with pressure, or with contact heat or hot air in the temperature range of 180° to 200° C.

The optimum pH region for dyeing is 2 to 9 or more particularly 4 to 8.

The commonly used dispersants are generally added, which are preferably of anionic or nonionic character and can also be used in mixture. About 0.5 gram of dispersant per litre of the dyeing medium are often sufficient, but greater amounts of up to about 3 grams per litre can be used. Amounts in excess of 5 grams per litre do not usually offer any further advantage. Known anionic dispersants which are suitable for use in the process are, for example, the condensation products of naphthalenesulphonic acids and formaldehyde, in particular dinaphthylmethane disulphonates, the esters of sulphonated succinic acid, Turkey red oil, the alkaline salts of the sulphuric acid esters of fatty alcohols, e.g. sodium lauryl sulphate and sodium cetyl sulphate, sulphite cellulose waste liquor and its alkaline salts, soaps, and the alkaline sulphates of the monoglycerides of fatty acids. Examples of known and very suitable nonionic dispersing agents are the adducts of approximately 3–40 mols of ethylene oxide and alkylphenols, fatty alcohols or fatty amines and their neutral sulphuric acid esters.

In padding and printing the normal thickening agents can be employed, for example modified or unmodified natural products such as sodium alginates, British gum, gum Arabic, crystal gum, locust beam gum, gum tragacanth, carboxymethyl cellulose, hydroxyethyl cellulose, methyl cellulose, and starches, or synthetic products such as polyacrylamides and polyvinylalcohols. The padding liquors and printing paste can also contain other assistants, such as urea, thiourea, glycols such as ethylene or propylene glycol, diethylene glycol, dithiodiglycol, glycerine, or alcohols, e.g. methyl, ethyl and iso-propyl alcohol, sodium-3-nitrobenzene-sulphonate or aqueous emulsions of sulphonated oils.

The dyes migrate and level very well during application, and the dyeings and prints are of very bright shade and are very fast to light, thermofixation, ozone, gas fumes, rubbing, washing, perspiration, water, sea water and cross-dyeing.

In the following examples the parts and percentages are by weight and temperatures in degrees centigrade.

EXAMPLE 1

A mixture of 1 part of 1-(2'-ethoxy-carbonlyl-ethyl-amino)-4-cyclohexylaminoanthraquinone, 1 part of the disodium salt of dinaphthylmethane disulphonic acid and 8 parts of water is ground until a fine dispersion is obtained, which is dispersed in 3000 parts of water. 100 parts of a nylon 66 fabric are entered into this dyebath. The temperature is increased to the boil in 30 minutes and the bath held at the boil for 1 hour. The dyed fabric is then removed, soaped, rinsed and dried. A brilliant blue dyeing is obtained which is fast to light, thermofixation, gas fumes, ozone and wet treatments.

Equally good results are obtained with fabrics of nylon 6, nylon 11 and nylon 610 fibre.

The dye used in this example can be produced as follows: A mixture of 320 parts of 1-amino-4-cyclohexyl-aminoanthraquinone, 1500 parts of 50% sulphuric acid and 180 parts of acrylic acid amide is heated at 70–75° for 12 hours with stirring. It is then run into 5000 parts of hot water and the precipitate is filtered off, washed with hot water until the filtrate runs neutral, and dried at 100°. 15 parts of the resulting 1-(2'-carboxyethyl-amino)-4-cyclohexylaminoanthraquinone are mixed with 100 parts of absolute ethyl alcohol and 15 parts of 100% sulphuric acid and the mixture heated at 80° for 1 hour. On cooling to 20°, 25 parts of 25% ammonia are added dropwise, causing precipitation of the ester in crystalline form. It is filtered off, washed with cold water and dried.

EXAMPLE 2

A mixture of 1 part of the methyl carbitol ester of 1 - (2' - carboxyethylamino) - 4 - cyclohexylaminoan-thraquinone, 1 part of sodium dinaphthylmethane di-sulphonate and 10 parts of water is ground to a fine dispersion, which is dispersed in 300 parts of water in the vessel of a high-temperature dyeing machine. 100 parts of a fabric of nylon 6 fibre are entered into the bath, the vessel is closed and the temperature raised to 130° in 30 minutes, with continued dyeing at this temperature for 1 hour. On cooling the dyed fabric is removed, soaped and dried. It has the same shade and fastness properties as the dyeing of Example 1.

EXAMPLE 3

A fine dispersion is prepared by grinding 1 part of the ester of ethylene glycol monoethyl ether and 1-(2'-carboxyethylamino) - 4 - (4' - methylcyclohexylamino)-anthraquinone with 1 part of a dispersant and 8 parts of water as specified in Example 1. 35 parts of water and 55 parts of crystal gum 1:2 are added to the dispersion to form a printing paste. The paste is printed on a nylon 66 fabric, and the print is dried and steamed for 30 minutes at 102–104°. The unfixed dye is then washed off and the fabric soaped at 40°. The print obtained has excellent fastness properties.

EXAMPLE 4

A fine dispersion is prepared by grinding 1 part of the 1,4-butylene glycol monoester of 1-(1'-methyl-2'-carboxyethylamino)-4-cyclohexylaminoanthraquinone as previously described. A padding liquor is prepared with this dispersion and 1 part of polyethylene glycol, 2 parts of oleyl polyglycol ether, 1.5 parts of urea, 0.5 part of oleic acid ethanol amide and 85 parts of water. A nylon 6 fabric is padded with this solution and expressed to an increase of about 70% over the dry weight. The fabric is dried at 100° and then thermofixed for 1 minute at 190–200°, rinsed, soaped and dried. A brilliant blue dyeing is obtained which is fast to light, thermofixation, ozone and wet treatments. The following table contains particulars of further especially valuable dyes of formula

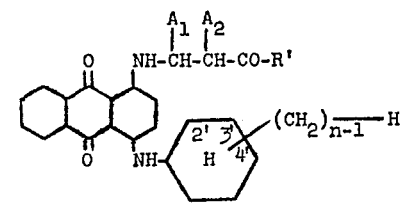

(II)

which are distinguished by the symbols $A_1$, $A_2$, $n$ and $R'$ by the position of the substituent in the cyclohexyl nucleus and by the shade of the dyeing on nylon 66 fabric.

| Example | $A_1$ | $A_2$ | $n$ | Position of Substituent | $R'$ | Shade |
|---|---|---|---|---|---|---|
| 5 | H | H | 1 | | Butoxy | Blue. |
| 6 | H | H | 1 | | 2-hydroxyethoxy | Do. |
| 7 | H | H | 1 | | 4-hydroxybutoxy | Do. |
| 8 | H | H | 1 | | 2-butoxyethoxy | Do. |
| 9 | H | H | 2 | 4' | 2-(2'-methoxy-ethoxy)-ethoxy | Do. |
| 10 | H | H | 1 | | 2-(2'-hydroxy-ethoxy)-ethoxy | Do. |
| 11 | $CH_3$ | H | 1 | | 6-hydroxyhexyloxy | Do. |
| 12 | H | $CH_3$ | 1 | | Cyclohexyloxy | Do. |
| 13 | H | H | 2 | 3' | $HO-CH_2-CH_2-S-CH_2-CH_2-O-$ | Do. |
| 14 | H | H | 2 | 2' | 3-methoxypropoxy | Do. |
| 15 | H | H | 1 | | 2-i-amyloxyethoxy | Do. |
| 16 | H | H | 1 | | 2-hydroxypropoxy | Do. |
| 17 | $CH_3$ | H | 2 | 3' | Phenylethyloxy | Do. |
| 18 | H | $CH_3$ | 2 | 2' | Benzyloxy | Do. |

Having thus disclosed what we claim is:

1. Process for the dyeing and printing of synthetic polyamide fibres with disperse dyestuffs of the formula

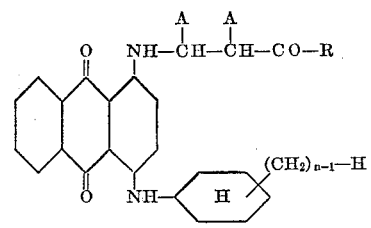

(I)

where one A stands for a hydrogen atom and the other A stands for a hydrogen atom or a methyl radical, R represents a member having at the most 8 carbon atoms which is selected from the group consisting of hydroxy, substituted and unsubstituted alkoxy, cycloalkoxy and aralkoxy and $n$ stands for 1 or 2.

2. Process for the dyeing and printing of synthetic polyamide fibres according to claim 1 with disperse dyestuffs of the formula

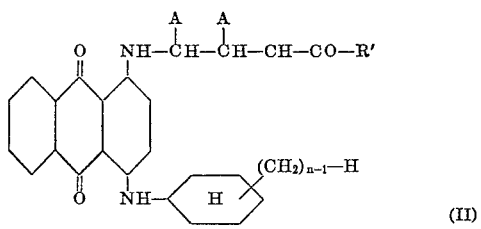

(II)

where one A stands for a hydrogen atom, the other A stands for a hydrogen atom or a methyl radical, R' represents a member selected from the group consisting of hydroxy, ethoxy, 2-hydroxyethoxy, 2-ethoxyethoxy, 2-(2'-hydroxyethoxy)-ethoxy, 2-(2'-methoxyethoxy)-ethoxy, 2-i-amyloxyethoxy, 2-(2'-hydroxyethylthio)-ethoxy, phenylethoxy, 2-hydroxypropoxy, 3-methoxypropoxy, butoxy, 4-hydroxybutoxy, 6-hydroxyhexoxy, cyclohexoxy and benzyloxy and $n$ stands for 1 or 2.

3. Process for the dyeing and printing of synthetic polyamide fibres according to claim 1 with the disperse dyestuff of the formula

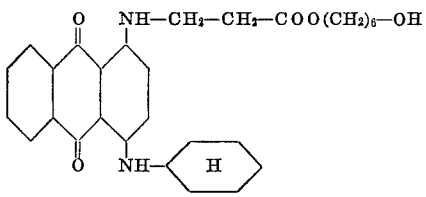

References Cited

UNITED STATES PATENTS

| | | | |
|---|---|---|---|
| 2,319,043 | 5/1943 | Dickey et al. | 260—376 |
| 3,320,021 | 5/1967 | Guenthard | 8—39 |

FOREIGN PATENTS

| | | |
|---|---|---|
| 1,470,597 | 1/1967 | France. |
| 357,129 | 11/1961 | Switzerland. |

NORMAN C. TORCHIN, *Primary Examiner.*

T. J. HERBERT, JR., *Assistant Examiner.*

PO-1050
(5/69)

UNITED STATES PATENT OFFICE
CERTIFICATE OF CORRECTION

Patent No. 3,411,861          Dated November 19, 1968

Inventor(s) Jacques Guenthard and Fred Mueller

It is certified that error appears in the above-identified patent and that said Letters Patent are hereby corrected as shown below:

Column 1, line 35, ", and R" should read —, R—; line 49, "e.g.," should read —e.g.—. Column 2, line 4, "$H_2-CH_2-CH_2-COO-C_2H_5$" should read —$H_2N-CH_2-CH_2-COO-C_2H_5$—; line 6, "$H_2N \ldots C_2H_5$" should read —$H_2N \ldots C_2H_5$.— line 23, "The ratio" should read —The liquor ratio—. Column 5, in the top right portion of the formula of claim 2, $$\text{"NH-CH-CH-CH-CO-R'"} \overset{\overset{A}{|} \overset{A}{|}}{\underset{|}{}} \quad \text{should read} \quad \text{—NH-CH-CH-CO-R'—} \overset{\overset{A}{|} \overset{A}{|}}{\underset{|}{}}$$

SIGNED AND
SEALED
APR 7 1970

(SEAL)
Attest:

Edward M. Fletcher, Jr.
Attesting Officer

WILLIAM E. SCHUYLER, JR.
Commissioner of Patents